(12) United States Patent
Terashima

(10) Patent No.: US 9,267,574 B2
(45) Date of Patent: Feb. 23, 2016

(54) DUAL CLUTCH TRANSMISSION CONTROL METHOD, DUAL CLUTCH TRANSMISSION, AND VEHICLE MOUNTED THEREWITH

(75) Inventor: Koji Terashima, Fujisawa Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 117 days.

(21) Appl. No.: 14/130,479

(22) PCT Filed: Jun. 29, 2012

(86) PCT No.: PCT/JP2012/066705
§ 371 (c)(1),
(2), (4) Date: Dec. 31, 2013

(87) PCT Pub. No.: WO2013/005675
PCT Pub. Date: Jan. 10, 2013

(65) Prior Publication Data
US 2014/0149009 A1 May 29, 2014

(30) Foreign Application Priority Data

Jul. 4, 2011 (JP) .................................. 2011-148159

(51) Int. Cl.
*F16H 3/08* (2006.01)
*F16H 61/02* (2006.01)
(Continued)

(52) U.S. Cl.
CPC .................. *F16H 3/08* (2013.01); *F16H 61/02* (2013.01); *F16H 61/688* (2013.01); *B60W 10/02* (2013.01);
(Continued)

(58) Field of Classification Search
CPC ............... F16D 2500/50296; F16D 2500/1045
See application file for complete search history.

(56) References Cited

U.S. PATENT DOCUMENTS 6,209,406 B1 * 4/2001 Sperber et al. .................. 74/330
6,463,821 B1 * 10/2002 Reed et al. ...................... 74/330
(Continued)

FOREIGN PATENT DOCUMENTS

EP 2256359 B1 12/2010
JP 2006-132562 5/2006
(Continued)

OTHER PUBLICATIONS
International Search Report dated Aug. 28, 2012 in PCT/JP2012/066705.
(Continued)

*Primary Examiner* — Ramya Burgess
*Assistant Examiner* — David Morris
(74) *Attorney, Agent, or Firm* — Staas & Halsey LLP

(57) ABSTRACT

A method of a dual clutch transmission, a dual clutch transmission, and a vehicle equipped with the same which can reduce the load on a clutch on a start gear side to reduce the wear thereof and therefore make the clutch replacement interval longer. There are a first input shaft configured to be connected to a first clutch and a second input shaft configured to be connected to a second clutch. A set of odd-numbered gears and a set of even-numbered gears are arranged respectively across the first input shaft and second input shaft and an output shaft. When a vehicle starts, an absorbed energy Eabs by the second clutch is calculated while a start gear is partially connected to the second input shaft. The first clutch is partially connected (half clutch state) to the first input shaft, to which a support gear is synchronously engaged, when the absorbed energy exceeds a set value which is a predetermined threshold, the support gear having a gear ratio greater than that of the start gear by one speed or higher.

6 Claims, 8 Drawing Sheets

(51) Int. Cl.
*F16H 61/688* (2006.01)
*B60W 10/02* (2006.01)
*B60W 10/06* (2006.01)
*B60W 10/113* (2012.01)
*F16D 48/08* (2006.01)

(52) U.S. Cl.
CPC .............. *B60W 10/06* (2013.01); *B60W 10/113* (2013.01); *F16D 48/08* (2013.01); *F16D 2500/1045* (2013.01); *F16D 2500/50296* (2013.01)

(56) References Cited

U.S. PATENT DOCUMENTS

2006/0116239 A1 6/2006 Kumazawa et al.
2007/0191186 A1 8/2007 Bothe et al.

FOREIGN PATENT DOCUMENTS

| JP | 2006-132663 | 5/2006 |
| JP | 2007-170640 | 7/2007 |
| JP | 2007-176430 | 7/2007 |
| JP | 2007-522397 | 8/2007 |
| JP | 2008-309325 | 12/2008 |
| JP | 2011-112174 | 6/2011 |

OTHER PUBLICATIONS

Chinese Office Action dated Feb. 2, 2015 in corresponding Chinese Patent Application No. 201280032099.2.

* cited by examiner

PRIOR ART

PRIOR ART

DUAL CLUTCH TRANSMISSION CONTROL METHOD, DUAL CLUTCH TRANSMISSION, AND VEHICLE MOUNTED THEREWITH

This application claims the benefit under U.S.C. Section 371, of PCT International Application No. PCT/JP2012/066705, filed Jun. 29, 2012 and Japanese Application No. 2011-148159 filed Jul. 4, 2011, the contents of which are incorporated herein by reference.

TECHNICAL FIELD

The present invention relates to a method of controlling a dual clutch transmission, a dual clutch transmission, and a vehicle equipped with the same which reduce the load on both clutches and reduce the wear thereof to thereby improve the durability thereof, the dual clutch transmission including at least two input shafts and two clutches to smoothen gear shift operations.

BACKGROUND ART

Heretofore, a dual clutch transmission (hereinafter, referred to as the DCT) including two clutch systems has been developed for improvement in the gear shift time of an automated manual transmission (hereinafter, referred to as the AMT). The DCT generally includes a clutch for each of an even-numbered gear set and an odd-numbered gear set and shifts by switching the clutches. For this reason, a gear shift operation of an odd-numbered gear (or an even-numbered gear) can be performed while an even-numbered gear (or an odd-numbered gear) is being used. This DCT allows a quick gear shift with no gear shift time lag. Moreover, since the DCT transmits power by clutches, it has a simple structure and the power loss is small, or the transmission efficiency is good, which leads to less fuel consumption.

Here, the conventional DCT will be described with reference to FIGS. 7 and 8. As shown in FIG. 7, a DCT 1X includes a first input shaft 11, a second input shaft 12, a first clutch C1, a second clutch C2, a countershaft 13, gears G1 to G6, a gear GR, coupling sleeves S1 to S3, and a coupling sleeve SR.

The power of an engine (internal combustion engine) is received from a crankshaft 2 through the first clutch C1 or the second clutch C2, and that power is transmitted to an output shaft 3 after its speed is changed at one of the gears.

The second input shaft 12 is formed in a hollow shape, and the first input shaft 11 is coaxially inserted in the second input shaft 12. The gears G1, G3, G5, and GR are arranged on the first input shaft 11, and the gears G2, G4, and G6 are arranged on the second input shaft. The power can be transmitted by connecting the first clutch C1 to the first input shaft 11 or the second clutch C2 to the second input shaft, and synchronously engaging one of the coupling sleeves S1 to SR provided on the countershaft 13 to one of the gears G1 to GR.

The clutch C1 includes a flywheel C1a, a clutch cover C1b, a release bearing C1c, a diaphragm spring C1d, a pressure plate C1e, and a clutch disk C1f formed of a lining, a torsion damper, a thrust, and the like. The clutch C2 has a similar configuration as well.

As shown in FIG. 8, the DCT 1X described above further includes an electronic control unit ("ECU") 20, a clutch operation mechanism 21 which operates the clutch C1 or the clutch C2, and a synchronous engagement mechanism 22 which operates the coupling sleeves S1 to SR. Hydraulic pistons or the like can be used for the clutch operation mechanism 21 and the synchronous engagement mechanism 22.

Next, the operation of this DCT 1X during start will be described. This DCT 1X uses the gear G1 as a start gear DG1. When the vehicle stops travelling and the engine stops, the ECU 20 disconnects the first clutch C1 and the second clutch C2 and synchronously engages the coupling sleeve S1 to the start gear DG1. When the vehicle starts, the ECU 20 connects the first clutch C1 to the first input shaft 11. Circular arrows in FIG. 8 illustrate the transmission of power during this state.

Then, the ECU 20 synchronously engages the coupling sleeve S2 to the gear G2 so that smooth acceleration will be performed. In this way, in the case of a shift from the start gear DG1 to the gear G2, the first clutch C1 is disconnected (hereinafter, expressed as being fully disconnected), and the second clutch C2 is connected to the second input shaft 12 (hereinafter, expressed as being fully connected). Since the connection can be switched back and forth as described above, gear shift operations can be done smoothly.

Here, as described above, the DCT normally uses a predetermined gear such as the first gear or the second gear for start. Thus, the clutch to be used for start is either the one for the odd-numbered gears or the one for the even-numbered gears. Such a clutch is subjected to high load when brought into a connected state during start and wears accordingly. Thus, one of the clutches, the one for the odd-number gears or the one for the even-numbered gears, wears faster.

A clutch of a sufficiently large volume may be used to prevent this clutch wear. It is, however, difficult to secure a sufficiently large volume in the case of a DCT with two clutches housed in a small space. Meanwhile, there are devices employing a method that involves switching the start gear based on the worn states of the clutches, a start condition, etc. (see Patent Document 1 and Patent Document 2, for example). These devices can make the wear of the clutches even by selecting the appropriate start gear based on the worn states of the clutches. This, however, leads to a problem of changing the feel during start, which impairs the driving comfort of the vehicle.

PRIOR ART DOCUMENTS

Patent Document 1: Japanese patent application Kokai publication No. 2006-132562

Patent Document 2: Japanese patent application Kokai publication No. 2008-309325

SUMMARY OF THE INVENTION

To solve the above problem, the inventor has invented a method of controlling a dual clutch transmission that involves bringing both clutches into a half clutch state at the moment of start so as to reduce the load on the clutch on the start gear side and thereby reduce the wear thereof. This method is a method that sets multiple torque paths by connecting also the clutch other than the clutch linked to the start gear so as to increase the clutch volume.

By using this method, the clutch load is distributed. Thus, the durability of the clutch on the start gear side can be expected to improve. However, since the clutch other than the clutch on the start gear side is used in a half clutch state with a relatively large rotational speed difference, its wear may possibly increase. For this reason, it cannot be simply said that starting by using both clutches is always favorable.

The present invention has been made in view of the above problem, and an object thereof is to provide a method of controlling a dual clutch transmission, a dual clutch transmission, and a vehicle equipped with the same which can reduce the load on one of clutches to suppress the occurrence of wear of only the one clutch and therefore make the clutch replacement interval longer, and which can also reduce increase in the wear of the other clutch that occurs due to use of both clutches, without requiring any additional component and also without changing the feel during start.

A method of controlling a dual clutch transmission for achieving the above-described object is a method of controlling a dual clutch transmission a method of controlling a dual clutch transmission which includes at least a first input shaft configured to be connected to a first clutch and a second input shaft configured to be connected to a second clutch, and in which a set of odd-numbered gears and a set of even-numbered gears are arranged every one step for alternation respectively between the first the second input shafts and an output shaft, and in a case of starting transmission of power from a power source to the output shaft, the transmission of the power is started by synchronously engaging a start gear being one of the gears for start to the second input shaft and connecting the second clutch to the second input shaft, characterized in that the method comprises: calculating an absorbed energy by the second clutch while partially connecting the second clutch to the second input shaft, to which the start gear is synchronously engaged, after starting the transmission of the power from the power source to the output shaft; and partially connecting the first clutch to the first input shaft, to which a support gear is synchronously engaged, when the absorbed energy exceeds a predetermined threshold, the support gear having a gear ratio smaller than that of the start gear by one speed or higher or having a gear ratio greater than that of the start gear by one speed or higher.

By using both clutches at the moment when the vehicle starts, the wear of the clutch on the start gear side can be reduced. Thus, the clutch replacement interval can be made longer. On the other hand, since the clutch on the side other than the start gear side is used in a half clutch state with a relative large rotation speed difference, its wear may possibly increase.

According to this method, the absorbed energy by the clutch on the start gear side is calculated, and that absorbed energy is compared with a set value which is the predetermined threshold. The clutch on the support gear side is used when the absorbed energy exceeds the predetermined threshold. Thus, the wear of the clutch on the support gear side that occurs due to the use of both clutches can be reduced.

The energy absorbed by the clutch is calculated by the following formulae 1 and 2 with the torque transmitted from the power source (internal combustion engine) and the value of the difference between the rotational speed inputted to the clutch on the start gear side and the rotational speed outputted from the clutch on the start gear side. Here, the rotational speed inputted to the clutch on the start gear side is Nin (rpm), the rotational speed outputted from the clutch on the start gear side is Nout, the torque transmitted from the engine is T (Nm), the absorbed energy is Eabs (J), and the power loss is L (W).

[Formula 1]

$$L = \frac{2\pi T(N_{in} - N_{out})}{60} \quad (1)$$

[Formula 2]

$$E_{abs} = \int_0^\tau L\,dt \quad (2)$$

It takes time before the clutch is fully connected when it is used in a half clutch state for a relative long period of time during start, particularly when the vehicle is on a hill or heavily load. As a result, the energy absorbed by the clutch increases. In this case, the other clutch is brought into a half clutch state so that part of the engine torque can be transmitted to the other clutch. In this way, the wear of both clutches can be reduced, and therefore the durability of both clutches can be improved.

On the other hand, in the cases other than the above-described case, only the clutch on the start gear side is used for starting, so that the wear of the clutch on the support gear side can be reduced. In these cases, the load on the clutch on the start gear side is small, and there is no need to use both clutches.

Moreover, the above-described method of controlling a dual clutch transmission further comprises synchronously engaging the start gear and the support gear to the first input shaft and the second input shaft, respectively, when the transmission of the power from the power source to the output shaft stops. According to this method, the above operations and effects can be achieved by simply switching the clutches after start.

A dual clutch transmission for achieving the above-described object is a dual clutch transmission which includes at least a first input shaft configured to be connected to a first clutch and a second input shaft configured to be connected to a second clutch, and in which a set of odd-numbered gears and a set of even-numbered gears are arranged every one step for alternation respectively between the first and the second input shafts and an output shaft, and in a case of starting transmission of power from a power source to the output shaft, the transmission of the power is started by synchronously engaging a start gear being one of the gears for start to the second input shaft and connecting the second clutch to the second input shaft, characterized in that the dual clutch transmission comprises a support gear and a control device, the support gear having a gear ratio greater than that of the start gear by one speed or higher, or smaller than that of the start gear by one speed or higher, and the control device includes a control of calculating an absorbed energy by the second clutch while partially connecting the second clutch to the second input shaft, to which the start gear is synchronously engaged, after starting the transmission of the power from the power source to the output shaft, and a control of partially connecting the first clutch to the first input shaft, to which the support gear is synchronously engaged, when the absorbed energy exceeds a predetermined threshold.

According to these configurations, the above-described effects can be achieved without adding any component to a conventional dual clutch transmission. Thus, the cost can be reduced.

Moreover, the above-described dual clutch transmission further comprises an input-rotational-speed sensor configured to detect a rotational speed inputted to the second clutch, and an output-rotational-speed sensor configured to detect a rotational speed outputted from the second clutch, and the control device further includes a control of calculating torque transmitted from the power source, and a control of calculating the absorbed energy based on the torque and the value of a difference between the rotational speed inputted to the second clutch and the rotational speed outputted from the second clutch.

According to this configuration, the absorbed energy can be calculated by calculating the torque transmitted from the engine (power source) and assigning that torque and the input rotational speed detected by the input-rotational-speed sensor and the output rotational speed detected by the output-rotational-speed sensor into the formulae 1 and 2 mentioned above. In this way, whether to start by using both clutches or to start by using only one of the clutches can be determined.

In addition, in the above-described dual clutch transmission, the control device further includes a control of synchronously engaging the start gear and the support gear to the first input shaft and the second input shaft, respectively, when the transmission of the power from the power source to the output shaft stops. According to this configuration, the above-described operations and effects can be achieved by simply switching the clutches.

A vehicle for achieving the above-described object is equipped with the above-described dual clutch transmission. According to this configuration, the wear of the clutches can be made even, and the feel during start does not change. Thus, a vehicle with good driving comfort can be provided.

According to the present invention, it is possible to reduce the load on one of clutches to suppress the occurrence of wear of only the one clutch and therefore make the clutch replacement interval longer, and also to reduce increase in the wear of the other clutch that occurs due to use of both clutches, without requiring any additional component and also without changing the feel during start.

DESCRIPTION OF THE EMBODIMENTS

Figure 7:
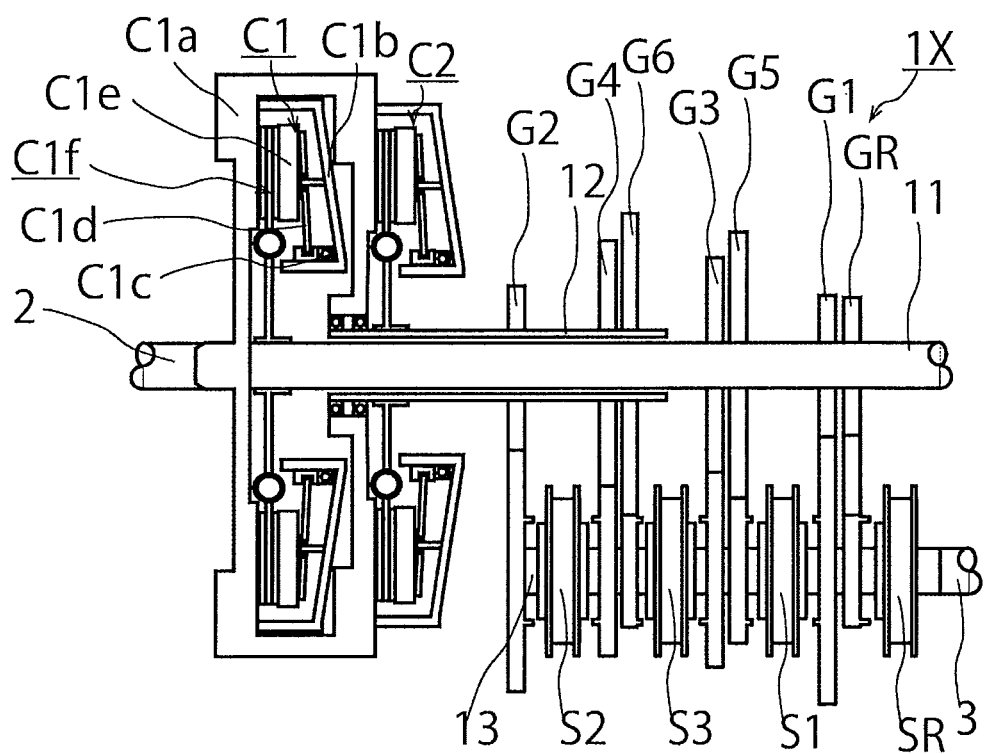
FIG. 7 is a diagram showing a conventional dual clutch transmission.

Hereinbelow, methods of controlling a dual clutch transmission, dual clutch transmissions, and vehicles equipped with the same of first and second embodiments according to the present invention will be described with reference to the drawings. Note that the same components and operations as those of the conventional dual clutch transmission (DCT) 1X shown in FIGS. 7 and 8 will be denoted by the same reference numerals, and description thereof will be omitted. Moreover, while the first and second embodiments according to the present invention will be illustrated by using a six-speed DCT, the number of gears is not limited and the DCTs of the present invention may be an eight-speed DCT, for example.

Figure 1:
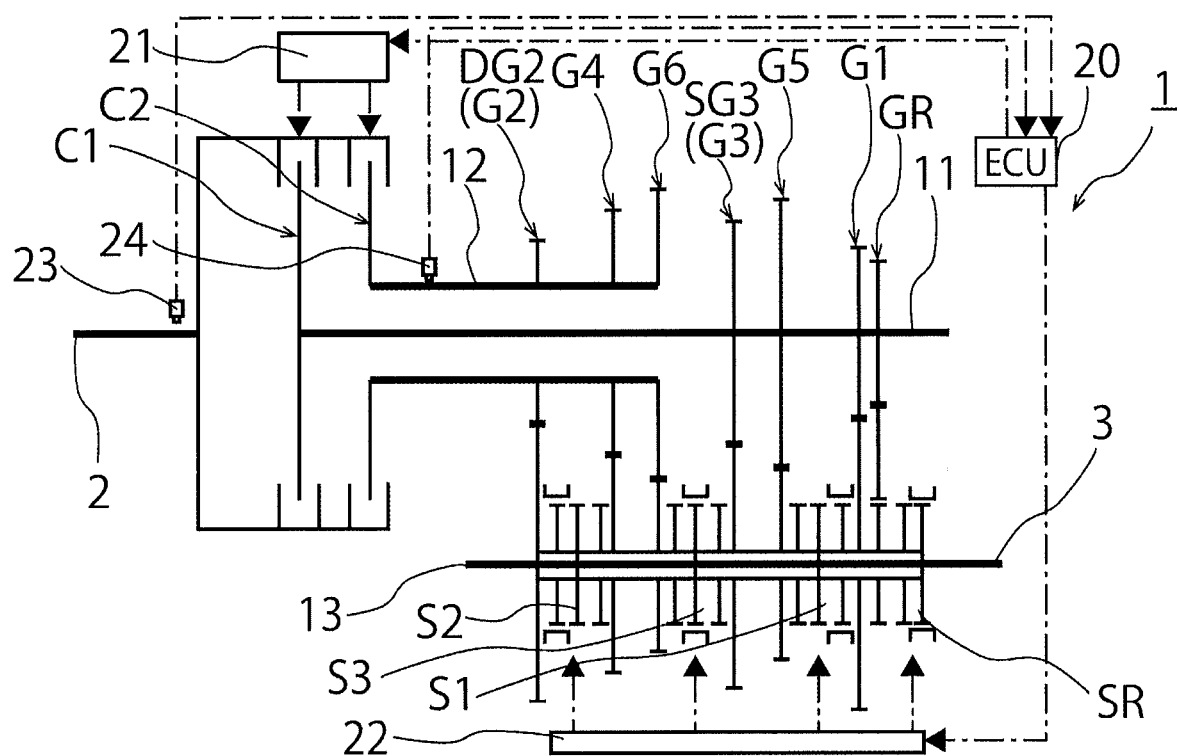
FIG. 1 is a schematic diagram showing a dual clutch transmission of a first embodiment according to the present invention.
Figure 8:
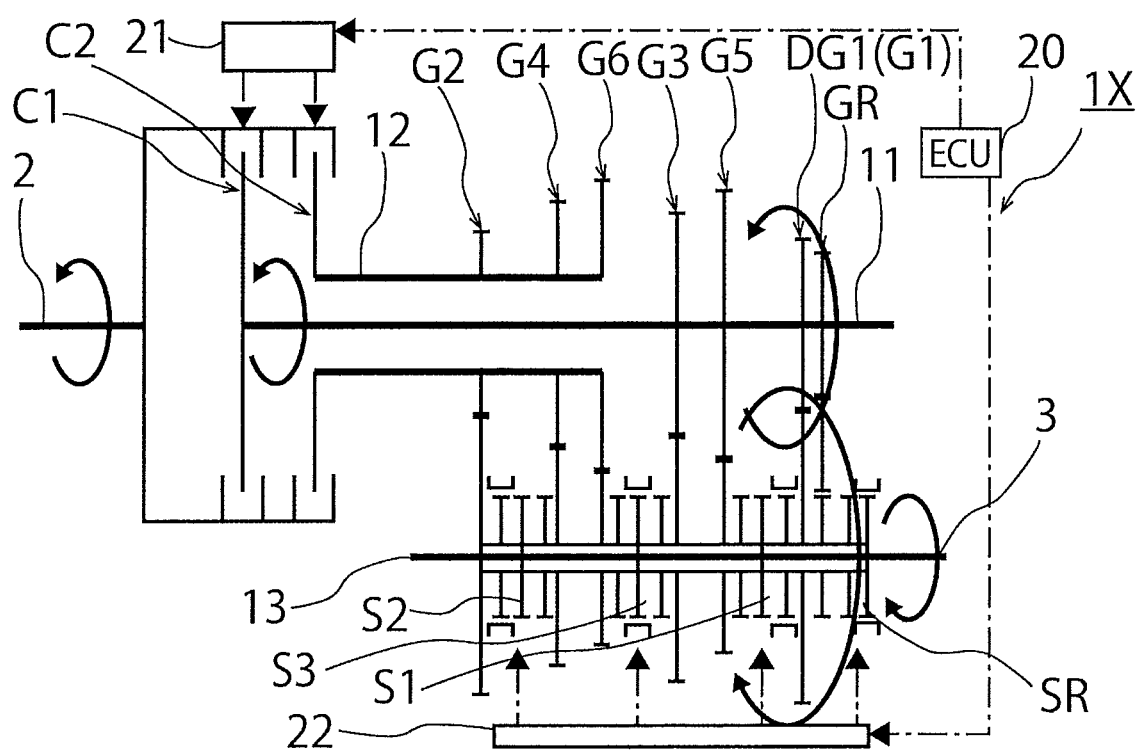
FIG. 8 is a schematic diagram showing the conventional dual clutch transmission.

As shown in FIG. 1, a dual clutch transmission (hereinafter, referred to as the DCT) 1 of the first embodiment according to the present invention, includes a first input shaft 11, a second input shaft 12, a first clutch C1, a second clutch C2, a countershaft 13, gears G1 to G6, a gear GR, coupling sleeves S1 to S3, a coupling sleeve SR, an ECU (control device) 20, a clutch operation mechanism 21, and a synchronous engagement mechanism 22, and uses a configuration similar to that of the conventional DCT X1 shown in FIG. 8. However, as shown in FIG. 1, the configuration is different from that of the conventional DCT X1 in that: the gear G2 and the gear G3 serve as a start gear DG2, and a support gear SG3, respectively; the clutch operation mechanism 21 is configured to be capable of simultaneously operating both clutches C1 and C2; and a second-clutch input-rotational-speed sensor 23 and a second-clutch output-rotational-speed sensor 24 are added.

This DCT 1 is not limited to the above configuration as long as it is an automated manual transmission, and no limitation is imposed on the arrangement of both input shafts, the numbers of the input shafts and the clutches mounted, the number of the gears, and so on. For example, it is possible to employ a configuration in which both input shafts are disposed not coaxially but in parallel with each other with the countershaft disposed between the input shafts. Moreover, the present invention may be applied to a triple clutch transmission including three clutches. Thus, as long as the DCT is a conventional one, no additional component needs to be particularly added. Accordingly, the cost can be reduced.

In the above configuration, the gear G2 is the start gear DG2, and the gear G3 which synchronously engages with the first input shaft 11 at a gear ratio higher than the start gear DG2 by one speed is the support gear SG3. This start gear may be set to any gear as long as it is the gear G1 (first speed) or higher. For example, when the gear G1 is the start gear, the gear G2 is set as the support gear.

The ECU 20 is configured to control the whole power plant including the transmission through electric circuits. The ECU 20 also controls the engine and is a microcontroller which performs total electrical control. In the case of an automatic transmission vehicle, the ECU 20 stores therein optimal control values for all the possible traveling states, and controls the mechanisms by causing sensors to detect the current state and selecting the optimal values from the stored data based input signals from the sensors.

This ECU 20 controls the connection of the first clutch C1 to the first input shaft 11 and the connection of the second clutch C2 to the second input shaft 12 independently and simultaneously. Moreover, the ECU 20 can also control each of the first clutch C1 and the second clutch C2 to bring them into a half clutch (partially connected) state. The half clutch state refers to a state where the clutch is not fully engaged. In this state, the drive power from the engine can be adjusted and transmitted to power transmission systems such as the transmission, transfer case, and differential gear. Thus, the drive power can be transmitted to the wheel(s) even during a low-speed traveling state where the traveling speed of the vehicle does not match the engine speed or during a stopped state.

In addition, the ECU 20 also performs control which brings the gears G1 to GR into synchronous engagement with the first input shaft 11 and the second input shaft 12 through the coupling sleeves S1 to SR. This control can bring the odd-numbered gear G1, G3, or G5 into synchronous engagement while the even-numbered gear G2, G4, or G6 is being used, for example, so as to achieve a smooth gear shift operation.

Further, the ECU 20 calculates an engine torque T. Furthermore, the ECU 20 calculates an absorbed energy Eabs by using the aforementioned formulae with the engine torque T and pieces of information detected by the second-clutch input-rotational-speed sensor 23 and the second-clutch output-rotational-speed sensor 24 to be described later. The ECU 20 determines whether or not the absorbed energy Eabs thus calculated is greater than a set value Elim which is a predetermined threshold. These calculation methods use the formula 1 and the formula 2 below installed in the ECU 20 as programs and calculate necessary values automatically.

[Formula 1]

$$L = \frac{2\pi T(N_{in} - N_{out})}{60} \quad (1)$$

[Formula 2]

$$E_{abs} = \int_0^t L\,dt \quad (2)$$

The clutch operation mechanism 21 only needs to be capable of operating the clutches C1 and C2 to connect them to the first input shaft 11 and the second input shaft 12, respectively, and operating the clutches C1 and C2 simultaneously. The clutch operation mechanism 21 is formed of a hydraulic piston, an electromagnetic actuator, and the like, for example. The synchronous engagement mechanism 22 includes shift forks which swing the coupling sleeves S1 to SR, and only needs to be capable of operating these shift forks. The synchronous engagement mechanism 22 is formed of a hydraulic piston, an electromagnetic actuator, and the like, for example. The clutch operation mechanism 21 and the synchronous engagement mechanism 22 are not limited to the configurations described above; the clutch operation mechanism 21 only needs to be capable of operating the clutches C1 and C2, and the synchronous engagement mechanism 22 only needs to be capable of operating the coupling sleeves.

The second-clutch input-rotational-speed sensor 23 is a sensor capable of detecting an input rotational speed Nin of the second clutch C2, and the second-clutch output-rotational-speed sensor 24 is a sensor capable of detecting an output rotational speed Nout of the second clutch C2. The input rotational speed Nin is the rotational speed of the crankshaft 2, and an existing crank angle sensor can be used. Moreover, the output rotational speed Nout is the rotational speed of the second input shaft 12 which is lower than the input rotational speed Nin due to the presence of the second clutch C2, and an existing speed sensor or the like, can be used. Considering the gear ratio of the support gear G3, this second-clutch output-rotational-speed sensor 24 can be provided to the output shaft 3 instead of being provided to the second input shaft 12.

Next, the operation of the DCT 1 will be described with reference to FIG. 2. As shown in Part (a) of FIG. 2, at the time of stopping the vehicle with its shift level (not shown) set at a D range, the ECU 20 synchronously engages the start gear DG2 and the support gear SG3 to the second input shaft 12 and the first input shaft 11, respectively. The D range refers to a drive range which is a mode used during normal travel and allowing a completely automatic gear shift function such that the vehicle can travel basically through accelerator and brake pedal operations only from start to high-speed travel to stop. This operation before the vehicle starts is not limited to the stopping of the vehicle with the shift level set at the D range as described above, as long as the start gear DG2 and the support gear SG3 are synchronously engaged.

Figure 2:
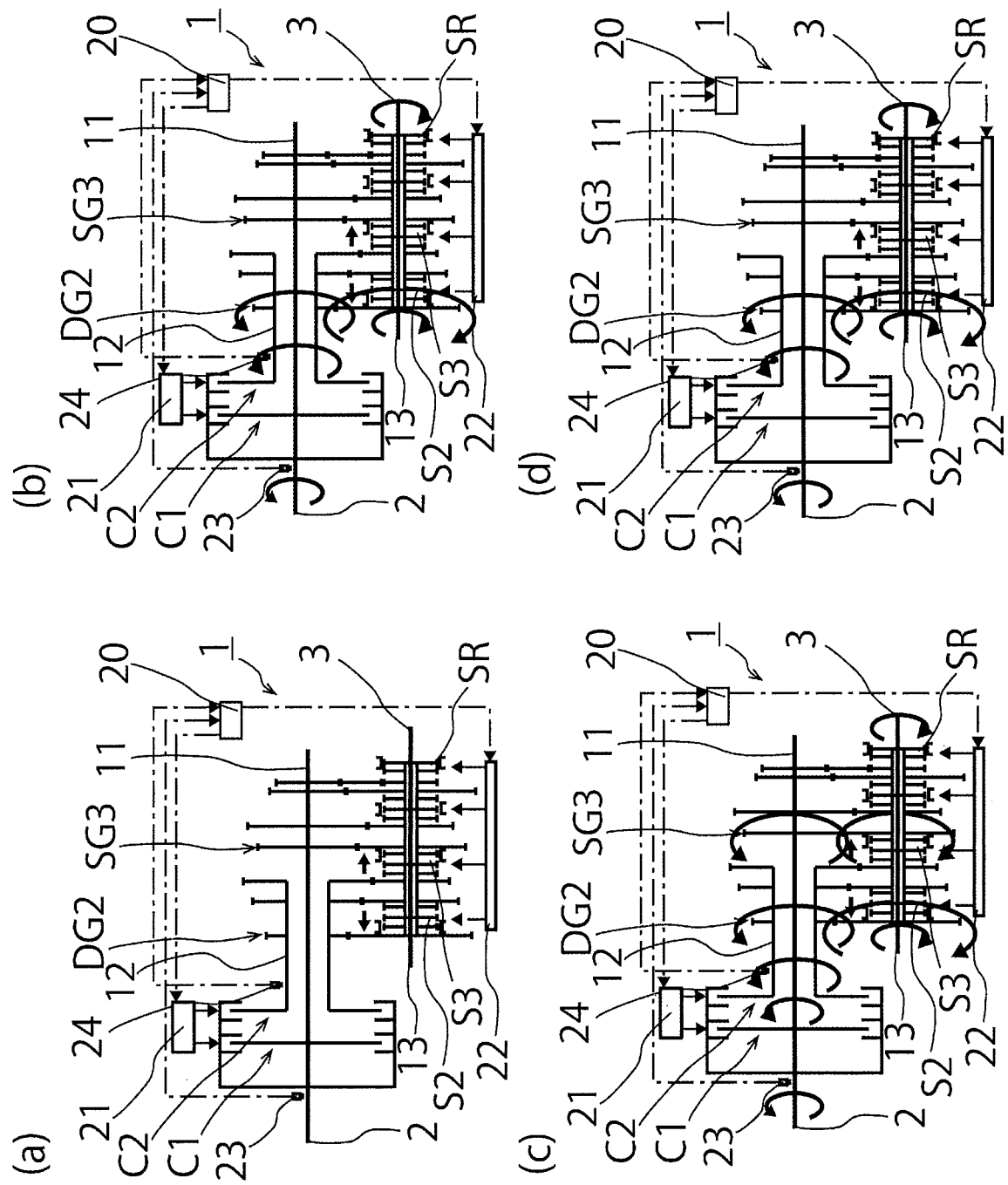
FIG. 2 is a start operation of the dual clutch transmission of the first embodiment according to the present invention. Part (a) is a diagram showing a state before start, Part (b) is a diagram showing a state at the moment of the start, Part (c) is a diagram showing a state where a rotational speed difference falls below a set value and a clutch on a support gear side is fully disconnected, and Part (d) is a diagram showing a state during acceleration.

Then, as shown in Part (b) of FIG. 2, when the vehicle starts, the second clutch C2 is gradually connected to the second input shaft 12 from a disconnected state of the clutch and set to a half clutch (partially connected) state. Meanwhile, the ECU 20 calculates the engine torque T, and the second-clutch input-rotational-speed sensor 23 and the second-clutch output-rotational-speed sensor 24 calculate the input rotational speed Nin and the output rotational speed Nout, respectively. The ECU 20 assigns these into the aforementioned formulae 1 and 2 to calculate the absorbed energy Eabs by the second clutch C2. The ECU 20 determines whether or not the absorbed energy Eabs thus calculated is greater than the set value Elim which is a predetermined value.

If the absorbed energy Eabs is greater than the set value Elim, the ECU 20 partially connects the first clutch to the first input shaft as shown in Part (c) of FIG. 2. In this way, both clutches C1 and C2 transmit the torque at the moment of the start. Thus, in addition to the second clutch C2 on the start gear DG2 side, the first clutch C1 on the support gear SG3 side takes part of the torque transmission.

Then, the input rotational speed Nin and the output rotational speed Nout detected by the second-clutch input-rotational-speed sensor 23 and the second-clutch output-rotational-speed sensor 24 are sent to the ECU 20, and the ECU 20 calculates a rotational speed difference $\Delta N$ therebetween (Nin−Nout). When this rotational speed difference $\Delta N$ falls below a set value Nlim which is a predetermined value, the first clutch C1 on the support gear SG3 side is disconnected from the first input shaft 11 (hereinafter, expressed as being fully disconnected) as shown in Part (d) of FIG. 2. After the first clutch C1 is fully disconnected, the second clutch C2 on the start gear DG2 side is fully connected to the second input shaft 12 (hereinafter, expressed as being fully connected).

Since this operation uses both clutches C1 and C2 during start, the wear of the second clutch C2 on the start gear DG2 side can be reduced. Accordingly, the replacement interval for both clutches C1 and C2 can be made longer.

Moreover, since whether or not to use the first clutch C1 is determined by determining whether or not the absorbed energy Eabs by the second clutch C2, which shifts to a half clutch state earlier than the other, is greater than the set value Elim, it is possible to suppress increase in the wear of the first clutch C1 which occurs due to the use of both clutches C1 and C2.

Further, in the case of a gear shift from the start gear DG2 to accelerate the speed, the acceleration can be done smoothly by simply switching the clutches C1 and C2 since the support gear SG3 remains synchronously engaged with the first input shaft 11.

Figure 3:
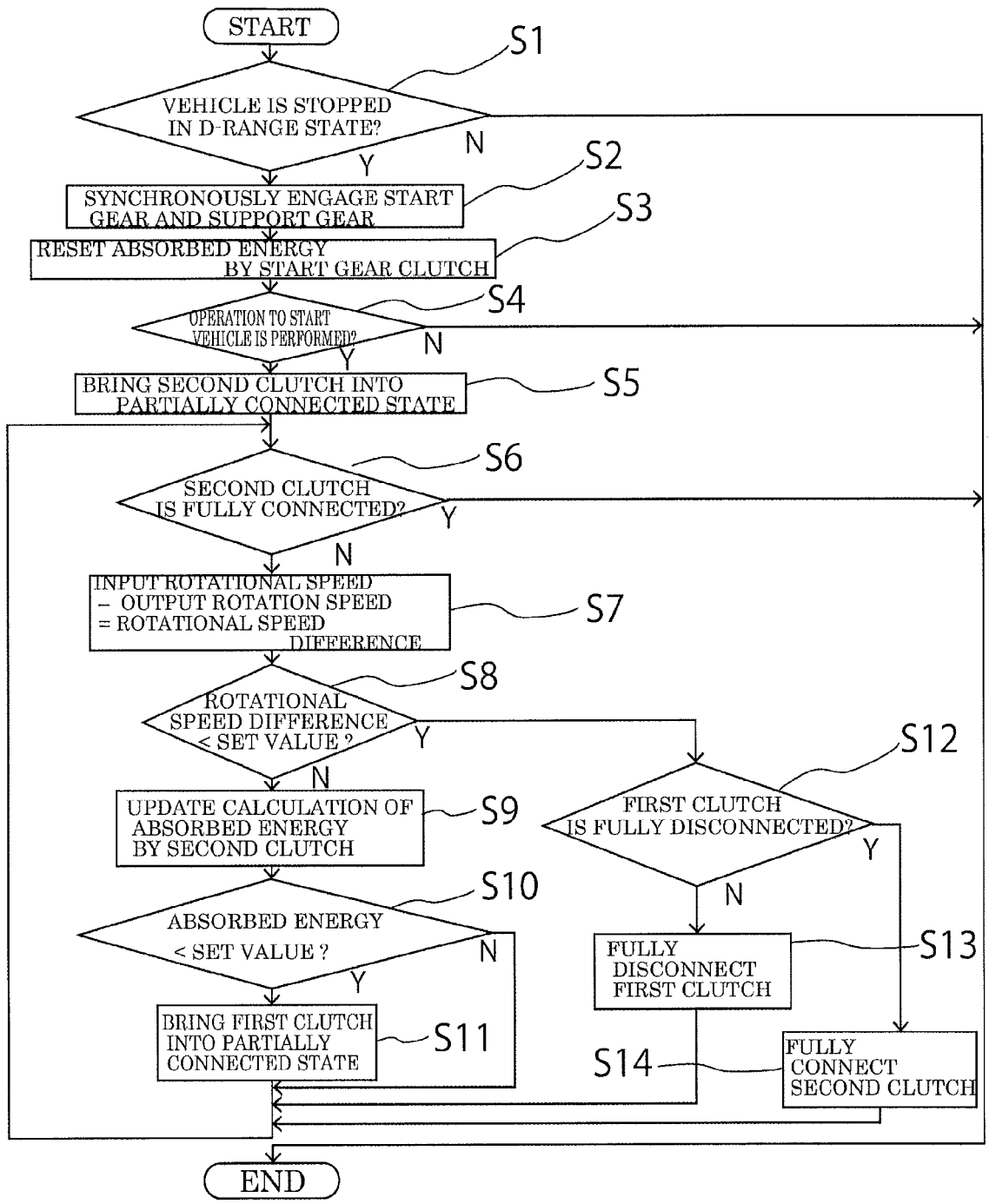
FIG. 3 is a flowchart showing a method of controlling the dual clutch transmission according to the first embodiment of the present invention.

Next, a method of controlling the DCT 1 will be described with reference to FIG. 3. First, the ECU 20 performs step S1 of determining whether or not the vehicle is stopped in the D-range state. If determining that the vehicle is stopped in the D-range state, the ECU 20 then performs step S2 of synchronously engaging the start gear DG2 and the support gear SG1 to the second input shaft 12 or the first input shaft 11. In step S2, the ECU 20 synchronously engages the start gear DG2 and the support gear SG3 by operating the synchronous engagement mechanism 22 to swing the coupling sleeve S2 and the coupling sleeve S3.

Then, the ECU 20 performs step S3 of resetting the value of the absorbed energy Eabs by the second clutch C2; the absorbed energy Eabs used in the last start is reset. Then, the ECU 20 performs step S4 of determining whether or not an operation to start the vehicle is performed. If determining that an operation to start the vehicle is performed, the ECU 20 then performs step S5 of connecting the second clutch C2 to the second input shaft 12 in a half clutch state. In step S5, the second clutch C2 which has been fully disconnected from the second input shaft 12 is gradually connected to the second input shaft 12 until it reaches a half clutch state. At this point, the first clutch C1 is fully disconnected, the second clutch C2 is in a half clutch state or is shifting from a fully disconnected state to a half clutch state, the start gear DG2 is synchronously engaged, and the support gear SG3 is synchronously engaged.

Then, the ECU 20 performs step S6 of determining whether or not the second clutch C2 is fully connected. The ECU 20 proceeds to the next step since the second clutch C2 is in a half clutch state or is shifting from a fully disconnected state to a half clutch state. Then, the ECU 20 performs step S7 of calculating the rotational speed difference $\Delta N$ between the input rotational speed Nin and the output rotational speed Nout of the second clutch C2. Then, the ECU 20 performs step S8 of determining whether or not the rotational speed difference $\Delta N$ is smaller than the set value Nlim which is a predetermined threshold.

If this rotational speed difference $\Delta N$ is smaller than the set value Nlim, the second clutch 12 stays in a half clutch state only for a short period of time and gets fully connected to the second input shaft 12 quickly. Accordingly, the wear of the second clutch C2 is relatively small. Thus, in this case, the ECU 20 proceeds to step S12 to be described later. Here, the set value Nlim is set preferably to such a value that "set value Nlim=rotational speed difference $\Delta N$>0."

Then, if determining that the rotational speed difference $\Delta N$ is the set value Nlim or more, the ECU 20 performs step S9 of updating the calculation of the absorbed energy Eabs by the second clutch C2. If the rotational speed difference $\Delta N$ is the set value Nlim or more, the absorbed energy Eabs by the second clutch C2 is large. Thus, it may take time before the second clutch C2 gets fully connected in some cases. In such cases, the wear of the second clutch C2 is severe. In step S9, the ECU 20 calculates the absorbed energy Eabs by the second clutch C2 by using the aforementioned calculation methods. The ECU 20 then performs step S10 of determining whether or not the absorbed energy Eabs exceeds the set value Elim. If the absorbed energy is equal to or smaller than the set value Elim, the ECU 20 returns to step S6.

Then, if the absorbed energy Eabs exceeds the set value Elim, the ECU 20 performs step S11 of bringing the first clutch C1 on the support gear SG3 side into a half clutch state. The absorbed energy Eabs exceeding the set value Elim refers, for example, to when the vehicle starts on a hill or when the vehicle is heavily loaded. In such a situation, the second clutch C2 stays in a half clutch state for a relatively long period of time. That is, it takes time before the second clutch C2 gets fully connected, and the wear thereof is severe. For this reason, in this situation, both clutches C1 and C2 are used to start the vehicle. In this way, the wear of the second clutch C2 can be reduced.

Once completing step S11, the ECU 20 then turns to step S6. At this point, the first clutch is in a half clutch state, the second clutch is in a half clutch state, the start gear DG2 is synchronously engaged, and the support gear SG3 is synchronously engaged. From this state, the rotational speed difference $\Delta N$ of the second clutch C2 starts to decrease gradually. Then, the ECU 20 again calculates the rotational speed difference $\Delta N$ in step S7 and determines in step S8 whether or not the rotational speed difference $\Delta N$ is smaller than the set value Nlim which is a predetermined threshold.

If determining that the rotational speed difference $\Delta N$ is smaller than the set value Nlim, the ECU 20 then performs step S12 of determining whether or not the first clutch C1 is fully disconnected. Since the first clutch C1 is in a half clutch state, the ECU 20 then performs step S13 of fully disconnecting the first clutch C1 Once completing step S13, the ECU 20 returns to step S6. At this point, the first clutch is fully disconnected, the second clutch is in a half clutch state, the start gear DG2 is synchronously engaged, and the support gear SG3 is synchronously engaged.

Through steps S6 to S12, determining this time that the first clutch C1 is fully disconnected, the ECU 20 performs the next step S14 of fully connecting the second clutch. Then, the ECU 20 returns to step S6 and ends this control method since the second clutch is fully connected. In the final state, the first clutch is fully disconnected, the second clutch is fully connected, the start gear DG2 is synchronously engaged, and the support gear SG3 is synchronously engaged. In the case of a gear shift after this from the start gear DG2 to the support gear SG3 to accelerate the speed, the acceleration can be done smoothly by simply switching the first clutch C1 and the second clutch C2.

The absorbed energy Eabs does not become large in cases other than when the half clutch state continues for a relatively long period of time, such as when the vehicle starts on a hill or is heavily loaded. Thus, the ECU 20 returns to step S6 from step S10. Since the first clutch C1 is fully disconnected, the ECU 20 performs the step S14 and ends the method. In the case where it does not take time before the second clutch C2 gets fully connected, starting the vehicle by using both clutches C1 and C2 causes the first clutch to be used in a half clutch state with a relatively large rotational speed difference and thereby increase the wear thereof. For this reason, in the case where it does not take time before the second clutch C2 gets fully connected as described above, the first clutch C1 is not used and only the second clutch C2 is used for start.

According to this method, in the case where the second clutch C2 on the start gear DG2 side is used in a half clutch state for a long period of time and it takes time before the second clutch C2 gets fully connected, thereby increasing the wear thereof, both clutches C1 and C2 are used to reduce the load on the second clutch C2 on the start gear DG2 side. In this way, the wear of the second clutch C2 can be reduced. Accordingly, the replacement interval for the second clutch C2 can be made longer. On the other hand, in the case where the second clutch C2 is fully connected quickly and the wear thereof is relatively small, the first clutch C1 is not used. In this way, unnecessary increase in the wear of the first clutch can be suppressed. In addition, the above-described operation and effect can be achieved as long as both clutches C1 and C2 can be operated independently and simultaneously. Thus, no additional component is needed for a conventional DCT. Accordingly, the cost can be reduced. Further, since the start gear DG2 is always the same gear each time start is performed, the wear of both clutches C1 and C2 can be reduced without changing the feel during start.

Figure 4:
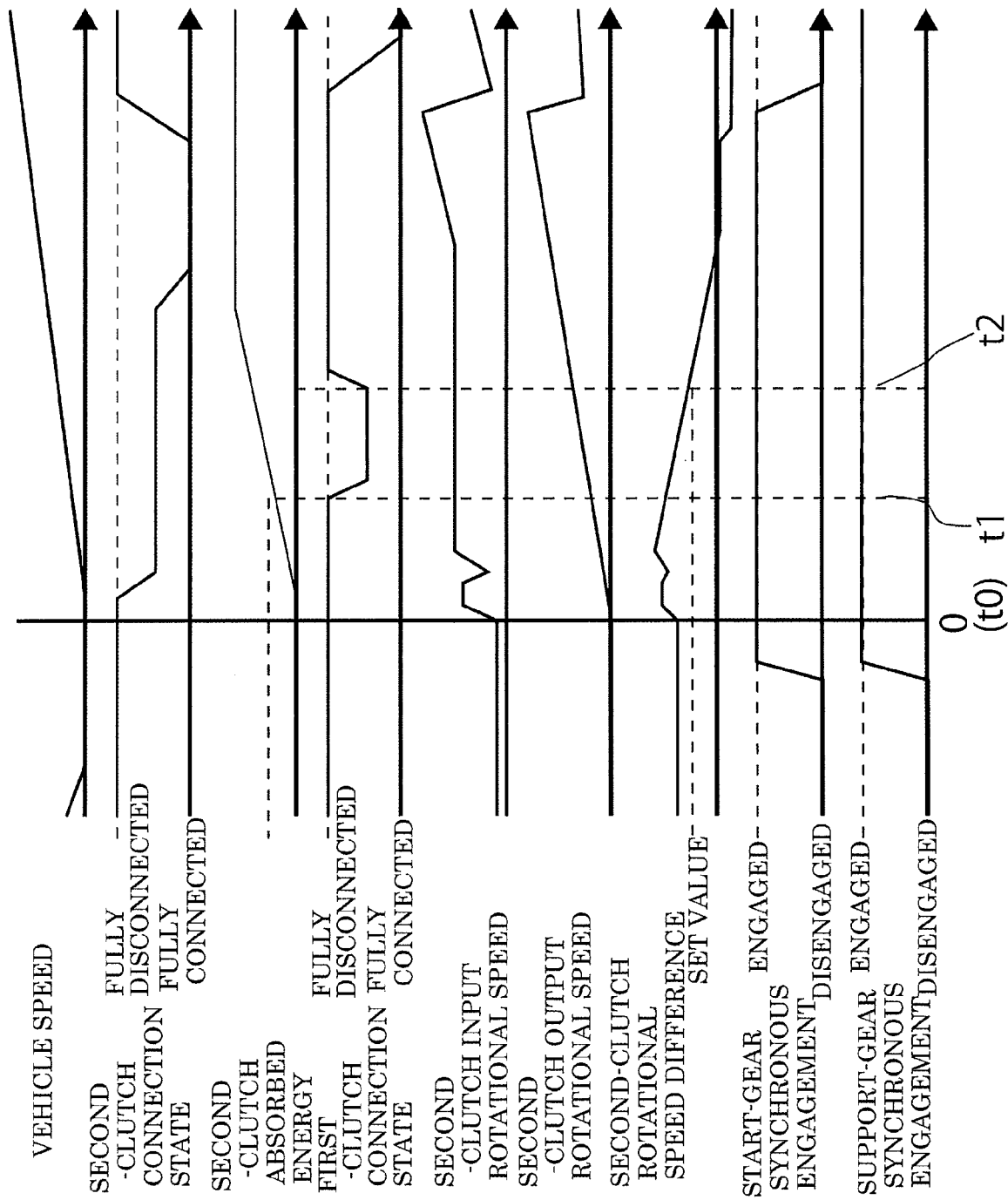
FIG. 4 is a diagram showing the operation of each part of the dual clutch transmission of the first embodiment according to the present invention.

Next, how each part operates in the above control method will be described with reference to FIG. 4. It is assumed that: time t0 is time at which a start operation is performed; time t1 is time at which the rotational speed difference $\Delta N$ is greater than the set value Nlim and the absorbed energy Eabs exceeds the set value Elim; and time t2 is time at which the rotational speed difference $\Delta N$ falls below the set value Nlim.

At the time t0, a start operation is performed. In response to determining that start operation, the second clutch C2 is brought into a half clutch state. The input rotational speed Nin of the start gear DG2 becomes constant after a short period of time, while the output rotational speed Nout keeps increasing gradually, thereby decreasing the rotational speed difference $\Delta N$ gradually from a value greater than the set value Nlim. Meanwhile, the absorbed energy Eabs keeps increasing gradually. At the time t1 at which the rotational speed difference $\Delta N$ is greater than the set value Nlim and the absorbed energy Eabs exceeds the set value Elim, the first clutch C1 on the support gear SG3 side is brought into a half clutch state. At the time t2 at which the rotational speed difference $\Delta N$ falls below the set value Nlim, the support gear SG3 is fully disconnected, and the second clutch C2 on the start gear DG2 side starts to be fully connected.

As can be seen from the above operations, by applying the control method of the present invention to a conventional DCT, it is possible to reduce the load on both clutches C1 and C2 and therefore reduce the wear thereof.

Figure 5:
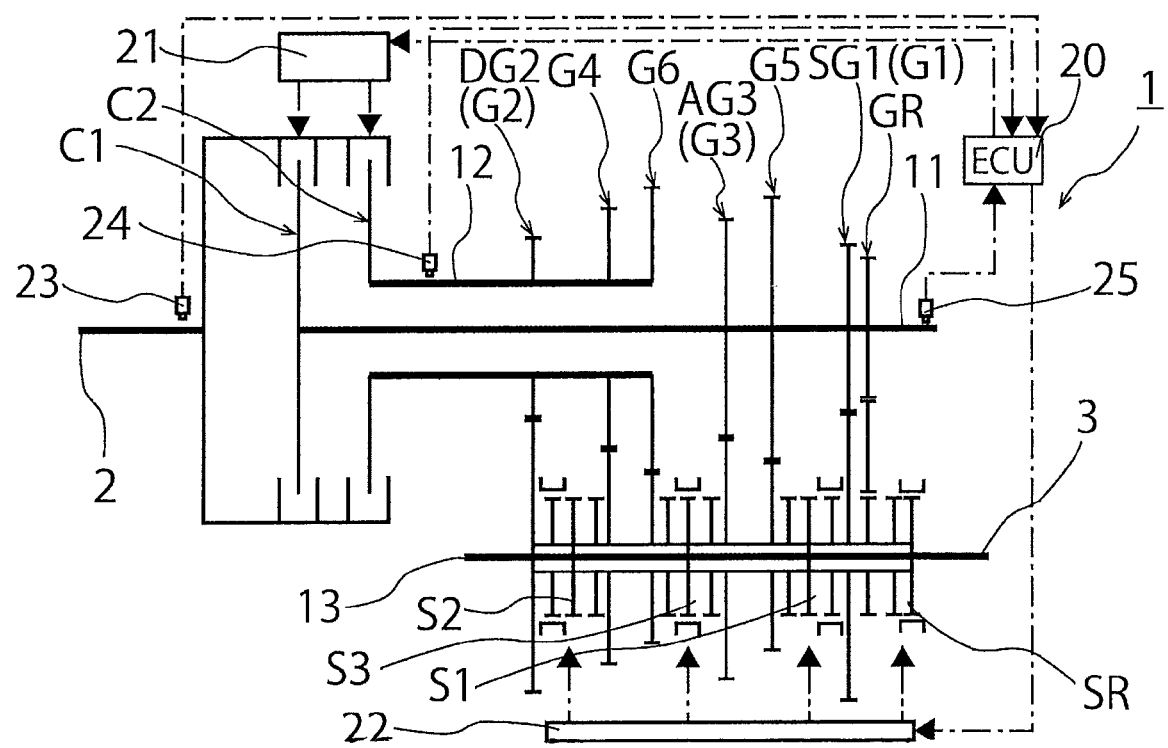
FIG. 5 is a schematic diagram showing a dual clutch transmission of a second embodiment according to the present invention.

Next, a dual clutch transmission of the second embodiment according to the present invention will be described with reference to FIG. 5. As shown in FIG. 5, a support gear SG1 and an acceleration gear AG3 are provided instead of the aforementioned support gear in FIG. 1. Moreover, a first-clutch output-rotational-speed sensor 25 is added. This support gear SG1 is a gear G1 which synchronously engages with the first input shaft 11 at a gear ratio lower than the start gear DG2 by one speed. This start gear may be set to any gear as long as it is the gear G2 (second speed) or higher. Moreover, the support gear only needs to have a gear ratio lower than the start gear by one speed or higher and synchronously engage with the input shaft other than that for the start gear. For example, when the gear G3 is the start gear, the gear G2 and the gear G4 are set as the support gear and the acceleration gear, respectively.

Figure 6:
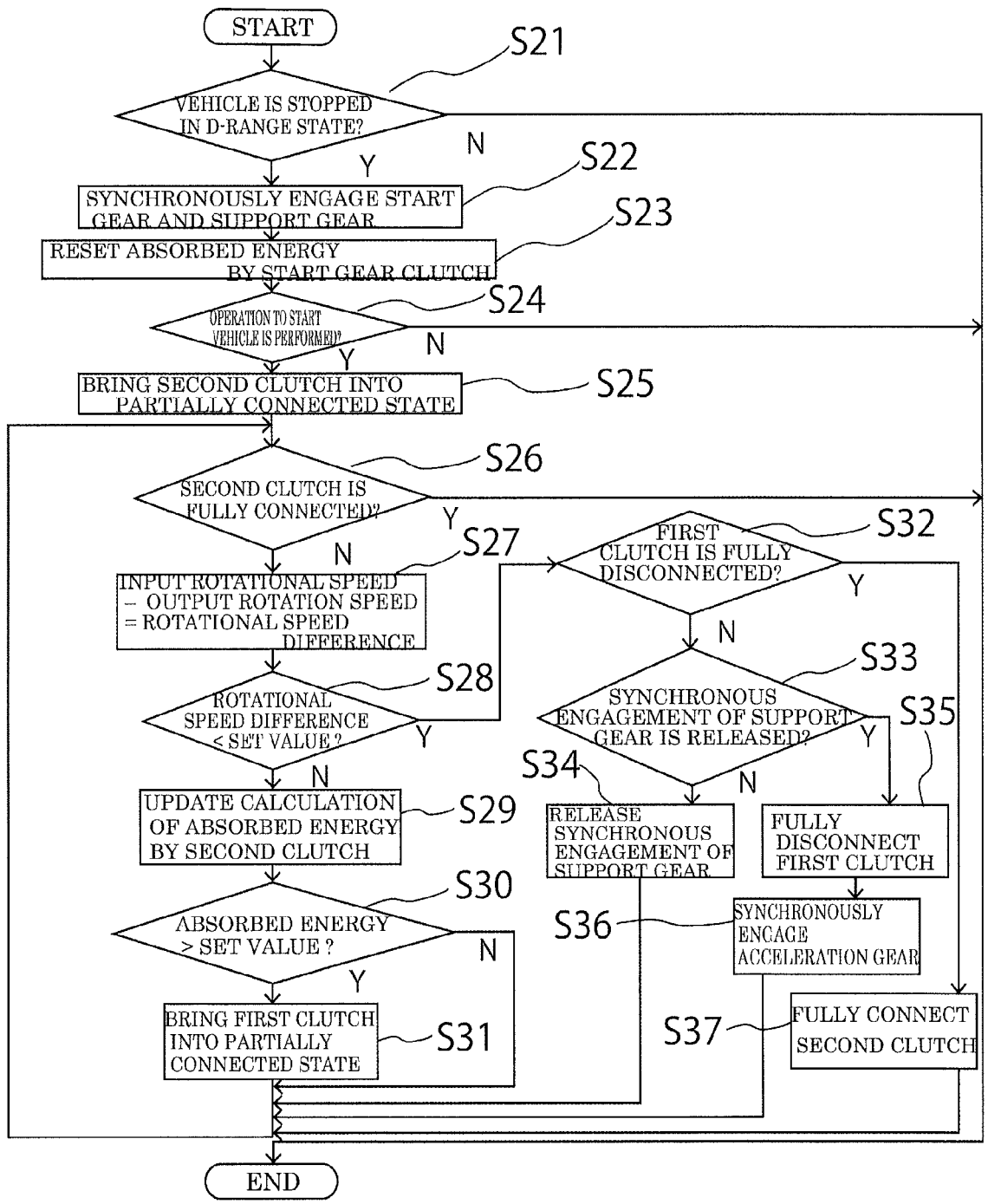
FIG. 6 is a flowchart showing a method of controlling the dual clutch transmission according to the second embodiment of the present invention.

Next, a method of controlling the dual clutch transmission 1 of the second embodiment according to the present invention will be described with reference to FIG. 6. Steps S21 to S32 in this control method are generally the same as steps S1 to S12 in the control method of the first embodiment described earlier. However, steps S27 and S28 are different in that the input rotational speed and the output rotational speed of the first clutch C1 are detected, because the support gear SG1 has a lower gear ratio than the start gear DG2. At this point, the first clutch is in a half clutch state, the second clutch is in a half clutch state, the start gear DG2 is synchronously engaged, and the support gear SG1 is synchronously engaged.

If determining in step S32 that the first clutch C1 is not fully disconnected, the ECU 20 then performs step S33 of determining whether or not the synchronous engagement of the support gear SG1 is released. Since the synchronous engagement of the support gear SG1 is not released, the ECU 20 performs next step S34 of releasing the synchronous engagement of the support gear SG1. Once completing step S34, the ECU 20 returns to step S26. At this point, the first clutch C1 is in a half clutch state, the second clutch C2 is in a half clutch state, the start gear DG2 is synchronously engaged, and the support gear SG1 is released from its synchronous engagement.

Then, through steps S26 to S33, determining that the synchronous engagement of the support gear SG1 is released, the ECU 20 then performs step S35 of fully disconnecting the first clutch C1. Then, the ECU 20 performs step S36 of synchronously engaging the acceleration gear AG3. Once completing step 36, the ECU 20 returns to step S26. At this point, the first clutch C1 is fully disconnected, the second clutch C2 is in a half clutch state, the start gear DG2 is synchronously engaged, the support gear SG1 is released from its synchronous engagement, and the acceleration gear AG2 is synchronously engaged.

Then, the ECU 20 determines in step S32 that the first clutch C1 is fully disconnected, and performs step S37 of fully connecting the second clutch C2. Then, the ECU 20 returns to step S26 and determines in step S26 that the second clutch C2 is fully connected, and ends this control method. According to this method, the same operation and effect as those described above can be achieved.

A vehicle equipped with the above-described DCT 1 can make the wear of both clutches C1 and C2 even and therefore make the replacement interval for both clutches C1 and C2 longer than conventional cases. Moreover, the above-described operation and effect can be achieved without changing the feel during start, and therefore a vehicle with good driving comfort can be provided.

The methods of controlling a dual clutch transmission of the present invention can reduce the load on the clutch on the start gear side and thus reduce the wear thereof and therefore make the clutch replacement interval longer, without requiring any additional component and also without changing the feel during start. Moreover, the methods of controlling a dual clutch transmission of the present invention can reduce the wear of the clutch on the support gear side since the absorbed energy by the clutch on the start gear side is calculated to determine whether or not to use both clutches. In addition, the methods of controlling a dual clutch transmission of the present invention can make a gear shift operation after start smooth. Accordingly, the methods of controlling a dual clutch transmission of the present invention can be utilized in large-sized vehicles such as trucks equipped with a dual clutch transmission to achieve low fuel consumption via smooth gear shift operations.

The invention claimed is:

1. A method of controlling a dual clutch transmission including a first input shaft to be connected to a first clutch, a second input shaft to be connected to a second clutch, a set of even-numbered gears arranged on the first input shaft, a set of odd-numbered gears arranged on the second input shaft, and an output shaft, the method comprising:
    providing, as a start gear, one gear from one of the set of odd-numbered gears or the set of even-numbered gears;
    providing, as a support gear, another gear of the other of the set of odd numbered gears or the set of even-numbered gears with a gear ratio different from that of the start gear;
    starting transmission of power from a power source to the output shaft by synchronously engaging the start gear to the second input shaft and synchronously engaging the support gear to the first input shaft;
    calculating an absorbed energy by the second clutch while the first clutch is fully disconnected and the second clutch is in a half clutch state and also partially connecting the second clutch to the second input shaft, to which the start gear is synchronously engaged; and
    partially connecting the first clutch to the first input shaft, to which the support gear is synchronously engaged, when the absorbed energy exceeds a predetermined threshold.

2. The method according to claim 1, further comprising:
    stopping the transmission of the power from the power source to the output shaft, and then synchronously engaging the start gear and the support gear to the second input shaft and the first input shaft, respectively.

3. A dual clutch transmission including a first input shaft to be connected to a first clutch, a second input shaft to be connected to a second clutch, a set of even-numbered gears arranged on the first input shaft, a set of odd-numbered gears arranged on the second input shaft, and an output shaft, comprising:
  a start gear which is one gear from one of the set of odd-numbered gears or the set of even-numbered gears;
  a support gear which is one gear of the other of the set of odd-numbered gears or the set of even-numbered gears and which has a gear ratio different than the start gear; and
  a controller configured to—
    start transmission of power from a power source to the output shaft by synchronously engaging the start gear to the second input shaft and synchronously engaging the support gear to the first input shaft,
    fully disconnecting the first clutch and putting the second clutch in a half clutch state,
    calculate an absorbed energy by the second clutch while partially connecting the second clutch to the second input shaft, to which the start gear is synchronously engaged, and
    partially connecting the first clutch to the first input shaft, to which the support gear is synchronously engaged, when the absorbed energy exceeds a predetermined threshold.

4. The transmission according to claim 3, further comprising:
  an input-rotational-speed sensor to detect a rotational speed inputted to the second clutch, and
  an output-rotational-speed sensor to detect a rotational speed outputted from the second clutch, and
  wherein the controller is further configured to—
  control calculating a torque transmitted from the power source, and
  control the calculating of the absorbed energy based on the torque and a difference in value between the rotational speed inputted to the second clutch and the rotational speed outputted from the second clutch.

5. The transmission according to claim 3, wherein the controller is further configured to control synchronously engaging the start gear and the support gear to the second input shaft and the first input shaft, respectively, when the transmission of the power from the power source to the output shaft stops.

6. The transmission according to claim 4, wherein the controller is further configured to control synchronously engaging the start gear and the support gear to the second input shaft and the first input shaft, respectively, when the transmission of the power from the power source to the output shaft stops.

* * * * *